Patented Sept. 26, 1950

2,523,889

UNITED STATES PATENT OFFICE 2,523,889

DIAZOTYPES CONTAINING DIALKOXY PHENOLS

William H. von Glahn, Loudonville, and Lester N. Stanley, Delmar, N. Y., assignors to General Aniline & Film Corporation, New York, N. Y., a corporation of Delaware No Drawing. Application July 2, 1947, Serial No. 758,700

8 Claims. (Cl. 95—6)

This invention relates to diazotype processes and more particularly to the use of certain azo components which are dialkoxyphenols in the development of the diazotype light sensitive layers.

The diazotype process, as is known, involves treating a carrier or base, usually paper which may be transparentized, film, such as obtained from cellulose esters or cellulose ethers or regenerated cellulose or the like, with a sensitizing composition containing a diazo compound as the light sensitive element, exposing to actinic light the thus-treated base through a pattern, subjecting the exposed material to development by means of an alkali in the presence of an azo dye coupling component capable of reacting with the undecomposed diazo compound to produce azo dye images. The azo dye coupling component may be contained in an alkaline developing solution, as in the so-called wet development method. When this type of development is used, the sensitizing composition for the base contains the diazo compound as the only azo dye component, the coupling component being applied separately at the time of development. In the more widely employed dry development or two-component diazotype process, the sensitizing composition for the base contains both the diazo compound and the azo coupling component. Here, the azo dye image is formed after exposure of the sensitized material by subjecting the exposed material to the action of alkaline vapors, such as ammonia vapors. In this two-component process, the dye components must have good precoupling stability, that is, they must be capable of co-existing in the light sensitive layer of the diazotype for prolonged periods without danger of prematurely coupling to form dyes in the light sensitive layer prior to use.

The two-component diazotype method is extensively used for the preparation of intermediate or transition prints in the reproduction of mechanical drawings, printed material, pictures or other originals which may be opaque and, therefore, must be copied by reflex exposure. It is especially desirable to prepare intermediate or transition prints, from which the ultimate prints are to be made, when it is desired to make a large number of reproductions from a frail or valuable original which would be adversely affected, if not destroyed, in the repeated exposures to light necessary to make the desired number of copies. In producing an intermediate print which is capable of being used as an original to reproduce further copies, a transparent or semitransparent paper or film is coated with a light sensitive diazotype sensitizing solution and dried. It is then exposed to actinic light rays, particularly from a source rich in the ultraviolet and near ultraviolet band of from 3600 Å. to 4200 Å. either by the printing-through or reflex process, as the case may be, and then developed by contacting the exposed light sensitive surface with an alkaline medium, preferably vapors of ammonia, as applied in the two-component process.

The efficiency of transition prints depends upon the covering power or photographic density, particularly its opacity to ultraviolet light, of the azo dye image produced and upon the transparency of the background where no azo dye has been developed. The transparency of the background, in the case of two-component coatings, depends upon the stability of the dye components in the light sensitive layer against premature coupling which may occur either in the coating solution or more commonly in the dried light sensitive layer during storage of the diazotype material. The efficiency of transition prints also, to some extent, depends upon the visual density of the image produced, since images of poor visual density, such as a yellow image on a white or transparent background, which may satisfy the requirements of opacity to ultraviolet light and transparency to the background nevertheless have the disadvantage of rendering difficult the detection of flaws in the intermediate image and it is often necessary to make a test print from the transition print of a deeper contrast than the transition print before such flaws can be detected.

Many types of azo dye coupling components are known to the diazotype art for the reproduction of prints of a deep color having good visual density. The most common of such azo dye components is phloroglucin which when coupled with the diazo compounds most commonly employed in diazotypes will reproduce the original in deep blue shades. However, despite the good visual density of such colors, their actinic opacity or photographic density is not sufficient to reproduce the image satisfactorily in subsequent diazotype copies obtained by using the first print as a transition print. For transition prints of good actinic opacity which may be used as intermediate prints, resorcinol has been extensively employed. Resorcinol prints have good opacity to ultraviolet light and also excellent visual density, since the azo dye images obtained by coupling resorcinol with the diazo compounds commonly employed in diazotypes are of a deep sepia shade. However, it has been found that the precoupling stability of resorcinol in diazotype layers is not sufficient to assure prolonged storage before use. Diazotypes on carriers, such as transparentized paper or film, having a light sensitive layer composed of the usual diazo compounds and addition components plus resorcinol as the coupling component gradually develop discoloration prior to use, which discoloration is produced by spontaneous coupling of the resorcinol and the diazo compound. This discoloration will be retained by the transition print and will be present in the background areas as well as in the image areas, thus impairing the ability of the background areas to efficiently transmit actinic light. Consequently, the light sensitive diazo compounds or other light sensitive media in the reproduction material employed for making further copies from the transition print will not be completely decomposed in the background areas. The discoloration appearing in the background area of the transition print will, therefore, be reproduced in final copies, diminishing the contrast between the background and the image in such final copies.

In our copending application Serial No. 688,962, filed August 7, 1946, now Patent No. 2,516,931, of which this application is a continuation-in-part, we have suggested as azo components for diazotypes the monoethers of resorcinol which are represented by the formula

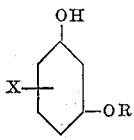

wherein R is a radical of the group consisting of alkyl, cycloalkyl, aryl, aralkyl and such radicals substituted by substituents selected from the group consisting of halogen, hydroxy, alkoxy, carboxy, carbalkoxy, carboamido, sulfo and amino and X is a member of the group consisting of hydrogen and substituents which do not adversely affect coupling capacity. This class of azo dye components produces two-component diazotype coatings which have excellent precoupling stability and when coupled with the residual diazo compounds after exposure and development of the image reproduce the original in shades which have good visual density and excellent photographic density or opacity to ultraviolet light. This application is concerned with a sub-class of the resorcinol ethers of our said copending application Serial No. 688,962. The members of this class have been found to be particularly suitable for the production of intermediate or transition prints and when employed in a light sensitive layer with a suitable diazo compound will, upon exposure and development in the usual manner, reproduce the image of an original in a yellow to sepia shade of high actinic opacity, good visual density and a high degree of transparency of the background areas. This class of azo components comprises dialkoxy derivatives of phenol corresponding to the formula

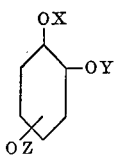

wherein one of X, Y and Z is hydrogen and the other two are members of the group consisting of methyl, ethyl and hydroxyethyl radicals. Azo components which are representative of this class include pyrogallol-1,3-dimethyl ether; pyrogallol-1,3-diethyl ether; pyrogallol-1,3-dihydroxyethyl ether; 2,5-dimethoxyphenol; 2,4-dimethoxyphenol and 3,4-dimethoxyphenol.

When using the dialkoxyphenols of this class as azo components in a two-component diazotype system, together with a diazo compound for the production of the light sensitive coating, a light sensitive layer is obtained which has a high degree of stability against precoupling, even under extreme conditions of temperature and humidity which may be encountered during prolonged storage. This high degree of stability against precoupling is also evidenced by subjecting such coatings to the conditions of accelerated aging tests. Accordingly, it is possible after a prolonged period of storage, which is often necessary for successful commercial distribution of the product, to make transition prints which have a colorless or transparent background of good actinic transparency. The images produced also have extremely good covering power or opacity to ultraviolet light, outstanding light and wash-fastness and offset properties (rubbing off of the dye, especially when using a hot printer roll) and good visual density. The prints which are obtained from these azo components evidence no loss of contrast due to migration of the azo components into the paper which occurs, for example, when resorcinol is employed as the azo component. The reprint qualities of the transition prints made from the light sensitive layers containing the dialkoxy derivatives of phenol of this class are excellent in view of these superior properties which eminently suit them for transition prints in the reproduction of further copies.

The low molecular weight dialkoxyphenols of this invention can be advantageously combined with other azo components, such as phloroglucinol and 2,3-dihydroxynaphthalene, which latter yield dyes of lesser opacity to ultraviolet light, but of better visual density. Such a combination results in a mixed dye image to which both the azo components contribute their respective properties. Hence the poor opacity properties of the high contrast azo components, such as phloroglucinol, are augmented by the good opacity properties of the dialkoxyphenol and the resultant dye image, therefore, has improved visual density and improved opacity to ultraviolet light. The dialkoxyphenols of this invention are also valuable as shading components for use in ordinary diazotype coating compositions. For example, in shading to a neutral black, especially when the latter is designed for possible use as an intermediate print.

In the preparation of diazotype layers intended for use as intermediate or transition print media in accordance with this invention, a suitable transparent base, such as transparentized paper, cellulose acetate film or other transparent material, is coated by spraying or other means of application known to the art with a light sensitive coating composition containing a suitable diazo compound or compounds in combination with such other materials as are ordinarily used in the preparation of diazotype compositions. If the resultant light sensitive layer is intended for one-component wet development use, then the dialkoxyphenol azo component is added to an alkaline devolping solution, but if a two-component dry development layer is desired, then the dialkoxyphenols are added to the light sensitive coating solution. As diazo compounds, we prefer to use those which are derived from p-diamines of the benzene series, particularly those in which at least one of the hydrogens of one of the amino groups is substituted by such groups as alkyl, alkoxyalkyl, aryl, aralkyl, alkylol, cycloaliphatic and heterocyclic groups. However, other diazo compounds have been found to be suitable, such as diazo anhydrides of aminohydroxynaphthalene compounds. The diazo compounds selected may be used in the form of their stabilized derivatives, such as the zinc chloride, cadmium chloride or tin chloride double salts, the fluoroborates and aryl or alkyl sulfonates of the diazo compound. Examples of amines from which such light sensitive diazo compounds are derived by the usual process of diazotization and salting-out of the diazo compound include:

N-hydroxyethyl-N-methylamino-p-amino benzene
p-Amino diphenylamine
1-monoethylamino-2(or 3)-methyl-4-aminobenzene
1-N-ethyl-N-hydroxyethylamino-3-methyl-4-aminobenzene
1-N,N-diethylamino-3-ethoxy-4-aminobenzene
1-N-benzoylamino-2,5-diethoxy(or dimethoxy)4-aminobenzene
1-N,N-diethylamino-4-aminobenzene
1-N,N-dihydroxyethylamino-3-chloro-4-aminobenzene
1-N-benzyl-N-ethylamino-4-aminobenzene
1-N,N-dimethylamino-4-aminobenzene,
p-Phenylenediamine
1-N,N-dihydroxyethylamino-4-aminobenzene
4'-ethoxyphenyl-2,5-diethoxyaniline.

The sensitizing compositions or coating solutions may contain, in addition to the diazo compound and the azo component, the usual adjuncts used in diazotype compositions, such as metal salts designed to intensify the dye image, including aluminum sulfate, titanium ammonium fluoride, nickel sulfate and the like, stabilizing agents, such as thiourea, thiosinamine and naphthalene trisulfonic acid, acids designed to retard precoupling, such as citric acid, tartaric acid and boric acid and hygroscopic agents, such as glycol, glycerine and dextrin.

The following specific examples will serve to further illustrate the invention, it being understood that no limitations are intended on the scope of the invention, either as to the proportions or as to the specific materials employed. Unless otherwise state, the parts are by weight.

Example 1

A transparentized diazotype paper stock is coated with a solution of the following materials made up to 100 cc. with water:

3.8 grams pyrogallol-1,3-dimethyl ether
4.0 grams N-hydroxyethyl-N-methylaminobenzene-p-diazo-$ZnCl_2$ double salt
5.0 cc. isopropanol
5.0 cc. glycol
8.0 grams citric acid
4.0 grams thiourea
0.5 gram saponin The coatings thus obtained after the usual drying operation were submitted to accelerated aging tests and found to be extremely stable to precoupling under the conditions of these tests. Upon exposure to light under an original pattern and after developing the image with ammonia fumes, the pattern of the original is reproduced in a yellowish-sepia shade having excellent opacity to ultraviolet light, excellent light and wash-fastness and excellent offset properties. Upon using these prints made from the coatings of this example as originals for reprinting on ordinary diazotype media, reprints are obtained having excellent line density and no background discoloration.

Example 2

A transparentized diazotype paper stock is coated with the solution of the following materials made up to 100 cc. with water:

3.8 grams pyrogallol-1,3-dimethyl ether
3.0 grams N-monoethylaminobenzene-p-diazo-$CdCl_2$ double salt
5.0 cc. isopropanol
5.0 cc. glycol
8.0 grams citric acid
4.0 grams thiourea
0.5 gram saponin The thus-coated paper is dried in the usual manner and submitted to accelerated aging tests and found to be extremely stable to precoupling under the conditions of these tests. Upon exposing the coatings to light under an original pattern and developing the image with ammonia fumes, the pattern of the original is reproduced in a greenish-yellow sepia shade which has excellent opacity to ultraviolet light, excellent light and wash-fastness and excellent offset properties. Upon using the prints thus made from the coatings of this example as originals for reprinting on ordinary diazotype media, reprints are obtained having excellent line density and no background discoloration.

Example 3

Transparentized paper stock is coated with a solution of the following materials made up to 100 cc. with water:

3.8 grams pyrogallol-1,3-dimethyl ether
3.5 grams 1-(N-ethylamino)-2-methyl-4-benzene-p-diazo-$ZnCl_2$ double salt
5.0 cc. isopropanol
5.0 cc. glycol
8.0 grams citric acid
4.0 grams thiourea
0.5 gram saponin The coatings obtained from the composition of this example are similar in their properties to those obtained in accordance with Example 1.

Example 4

Transparentized diazotype paper stock is coated with a solution of the following materials made up to 100 cc. with water:

3.8 grams pyrogallol-1,3-dimethyl ether
4.0 grams 2,5,4'-triethoxy diphenyl-1-diazonium acid sulfate
5.0 cc. isopropanol
5.0 cc. glycol
8.0 grams citric acid
4.0 grams thiourea
0.5 gram saponin The coatings obtained from this composition are dried in the usual manner and submitted to accelerated aging tests. They exhibit good stability to precoupling under the conditions of the tests. After exposure to light under an original pattern and development of the image with ammonia fumes, the pattern of the original is reproduced in a yellowish-sepia shade having outstanding opacity to ultraviolet light, excellent light and wash-fastness and excellent offset properties. Upon using the prints made from the coatings of this example as originals for reprinting on ordinary diazotype media, reprints are obtained having excellent line density and no background discoloration.

Example 5

A transparentized diazotype paper stock is coated with a solution of the following materials made up to 100 cc. with water:

3.8 grams pyrogallol-1,3-dimethyl ether
3.5 grams p-phenylaminobenzene-diazonium acid sulfate
5.0 cc. isopropanol
5.0 cc. glycol
8.0 grams citric acid
4.0 grams thiourea
0.5 gram saponin The coatings obtained from the composition of this example are similar in their properties to those obtained in accordance with Example 1.

Example 6

A transparentized diazotype paper stock is coated with a solution of the following materials made up to 100 cc. with water:

4.0 grams pyrogallol-1,3-diethyl ether
3.5 grams 2,5-diethoxy-4-benzoylaminobenzene-p-diazo-$ZnCl_2$ double salt
5.0 cc. isopropanol
5.0 cc. glycol
8.0 grams citric acid
4.0 grams thiourea
0.5 gram saponin The coatings thus obtained are dried in the usual manner and submitted to accelerated aging tests. They are found to have good stability to precoupling under the conditions of these tests. After exposure to light under an original pattern and development of the image with ammonia fumes, the pattern of the original is reproduced in an orange sepia shade having outstanding opacity to ultraviolet light, excellent light and wash-fastness and excellent offset properties. Upon using the prints thus made from the coatings of this example as originals for reprinting on ordinary diazotype media, reprints are obtained having excellent line density and no background discoloration.

Example 7

A diazotype coating solution is prepared containing the following materials made up to 100 cc. with water:

4.0 grams pyrogallol-1,3-dihydroxyethyl ether
3.8 grams N,N-diethylaminobenzene-p-diazo-$ZnCl_2$ double salt
5.0 cc. isopropanol
5.0 cc. glycol
8.0 grams citric acid
4.0 grams thiourea
0.5 gram saponin The coating solution is applied to diazotype paper stock in the usual manner and the coated paper dried. Samples of the thus-coated paper, upon being submitted to accelerated aging tests, are found to be extremely stable to precoupling under the conditions of such tests. Upon exposing the coated paper to light under an original pattern and developing the image with ammonia vapors, a reproduction of the pattern is obtained in a yellowish-sepia shade on a clear white background. The image areas have outstanding opacity to ultraviolet light, excellent light and wash-fastness and excellent offset properties.

Example 8

A cellulose acetate film base is coated with a solution of the following materials made up to 100 cc. with water:

12.0 grams 2,5-dimethoxyphenol
13.0 grams N-hydroxyethyl-N-methylaminobenzene-p-diazo-$ZnCl_2$ double salt
20.0 cc. isopropanol
5.0 cc. glycol
8.0 grams citric acid
1.0 gram phosphoric acid
1.0 gram formic acid
4.0 grams thiourea
0.5 gram saponin The coated transparency thus obtained is dried in the usual manner and submitted to accelerated aging tests under which it is found to be extremely stable to precoupling. Upon exposing samples of this coating to light under original patterns and developing the image with ammonia fumes, the originals are reproduced in a yellow sepia shade which has outstanding opacity to ultraviolet light, excellent light and wash-fastness and excellent offset properties. Upon using the prints thus made as originals for reprinting on ordinary diazotype media, reprints are obtained having excellent line density and no background discoloration.

In the accelerated aging test used to test the stability of the diazotype coatings of these examples against precoupling and decomposition of the dye components, the sensitized carrier is subjected to a temperature of 120° F. for 48 hours at a relative humidity of 50%.

We claim:

1. As new products, light sensitive layers on a suitable base containing a suitable light sensitive diazo compound and an azo coupling component selected from the class consisting of the compounds of the formula

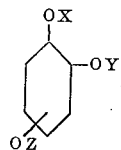

wherein one of X, Y and Z is hydrogen and the other two are members of the group consisting of methyl, ethyl and hydroxyethyl radicals.

2. As new products, light sensitive layers on a suitable base comprising a diazo compound derived from a p-diamino compound of the benzene series and an azo coupling component selected from the class consisting of the compounds of formula

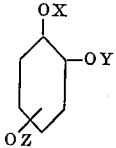

wherein one of X, Y and Z is hydrogen and the other two are members of the group consisting of methyl, ethyl and hydroxyethyl radicals.

3. As a new product, a light sensitive layer on a suitable base comprising a diazo derivative of a p-diamino compound of the benzene series and pyrogallol-1,3-dimethyl ether.

4. As a new product, a light sensitive layer on a suitable base comprising a diazo derivative of a p-diamino compound of the benzene series and pyrogallol-1,3-dihydroxyethyl ether.

5. As a new product, a light sensitive layer on a suitable base comprising a diazo derivative of a p-diamino compound of the benzene series and 2,5-dimethoxyphenol.

6. As a new product, a light sensitive layer on a suitable base comprising as the diazo compound N-hydroxyethyl-N-methyl aminobenzene-p-diazo-$ZnCl_2$ double salt and as the coupling component pyrogallol-1,3-dimethyl ether.

7. As a new product, a light sensitive layer on a suitable base comprising as the diazo compound N,N-diethylaminobenzene-p-diazo-$ZnCl_2$ double salt and as the coupling component pyrogallol-1,3-dihydroxyethyl ether.

8. As a new product, a light sensitive layer on a suitable base comprising as the diazo compound N-hydroxyethyl-N-methyl aminobenzene-p-diazo-$ZnCl_2$ double salt and as the coupling component 2,5-dimethoxyphenol.

WILLIAM H. von GLAHN.
LESTER N. STANLEY.

REFERENCES CITED

The following references are of record in the file of this patent:

UNITED STATES PATENTS

| Number | Name | Date |
|---|---|---|
| 2,196,950 | Zahn et al. | Apr. 9, 1940 |
| 2,246,425 | Poser et al. | June 17, 1941 |
| 2,432,593 | Straley | Dec. 16, 1947 |
| 2,437,868 | Glahn et al. | Mar. 16, 1948 |